(12) United States Patent
Lipman et al.

(10) Patent No.: US 10,248,229 B2
(45) Date of Patent: Apr. 2, 2019

(54) CONTROL APPARATUS

(75) Inventors: Sarah Michelle Lipman, Jerusalem (IL); Robert Michael Lipman, Jerusalem (IL); Zvi Weinberger, Jerusalem (IL)

(73) Assignee: Power2B, Inc., Santa Monica, CA (US)

( * ) Notice: Subject to any disclaimer, the term of this patent is extended or adjusted under 35 U.S.C. 154(b) by 0 days.

(21) Appl. No.: 10/599,399

(22) PCT Filed: Apr. 1, 2005

(86) PCT No.: PCT/IL2005/000365
§ 371 (c)(1),
(2), (4) Date: Mar. 16, 2007

(87) PCT Pub. No.: WO2005/094176
PCT Pub. Date: Oct. 13, 2005

(65) Prior Publication Data
US 2007/0176908 A1 Aug. 2, 2007

(30) Foreign Application Priority Data
Apr. 1, 2004 (GB) .................................. 0407453.0

(51) Int. Cl.
*G06F 3/038* (2013.01)
(52) U.S. Cl.
CPC .. *G06F 3/0386* (2013.01); *G06F 2203/04101* (2013.01)
(58) Field of Classification Search
CPC ............... G06F 3/0386; G06F 2203/04101
See application file for complete search history.

(56) References Cited

U.S. PATENT DOCUMENTS 3,758,211 A * 9/1973 Bateman et al. ............. 356/340
3,947,842 A * 3/1976 Hilsum et al. ................. 345/81
(Continued)

FOREIGN PATENT DOCUMENTS

| CN | 1818842 A | 8/2006 |
|----|-----------|--------|
| EP | 0572182 | 12/1993 |

(Continued)

OTHER PUBLICATIONS

EPO Search Report, EP, dated Oct. 14, 2010, Arranz, Jose.
(Continued)

*Primary Examiner* — Antonio Xavier
(74) *Attorney, Agent, or Firm* — Adam P. Daniels, Esq.; Polsinelli

(57) ABSTRACT

An interface including a panel (100) defining at least one edge (114, 116, 118, 120) at least one detector (102) arranged along the at least one edge (114) of the panel, an electromagnetic radiation beam emitter (152) operative to direct at least one beam of electromagnetic radiation onto the panel (100) from a variable distance and at a variable angle (158), the panel being operative to transmit electromagnetic radiation from the at least one beam impinging thereon to the at least one edge (114) thereof, for detection by the at least one detector, the panel being operative to generally attenuate the electromagnetic radiation passing therethrough to the at least one edge as a function of the distance traveled by the electromagnetic radiation through the panel (100), whereby the at least one detector (102) is operative to provide at least one output which can be used to determine the variable distance and the variable angle.

24 Claims, 8 Drawing Sheets

(56) References Cited

U.S. PATENT DOCUMENTS

| | | | |
|---|---|---|---|
| 3,973,852 A * | 8/1976 | Moore et al. | 356/438 |
| 4,320,292 A | 3/1982 | Oikawa et al. | |
| 4,464,738 A * | 8/1984 | Czajkowski | 367/97 |
| 4,566,808 A * | 1/1986 | Pompei | G01J 5/02 250/342 |
| 4,703,316 A | 10/1987 | Sherbeck | |
| 4,761,641 A * | 8/1988 | Schreiber | 345/1.3 |
| 4,766,424 A * | 8/1988 | Adler | G06F 3/0421 250/221 |
| 4,949,079 A | 8/1990 | Loebner | |
| 5,122,656 A | 6/1992 | Williams et al. | |
| 5,227,985 A | 7/1993 | Dementhon | |
| 5,270,711 A | 12/1993 | Knapp | |
| 5,283,968 A * | 2/1994 | Williams | 40/546 |
| 5,426,367 A * | 6/1995 | Martin et al. | 324/339 |
| 5,448,261 A | 9/1995 | Koike et al. | |
| 5,488,476 A * | 1/1996 | Mansfield et al. | 356/512 |
| 5,506,605 A | 4/1996 | Paley | |
| 5,529,065 A * | 6/1996 | Tsuchiya | 600/310 |
| 5,704,836 A | 1/1998 | Norton et al. | |
| 5,764,209 A | 6/1998 | Hawthorne et al. | |
| 5,774,107 A * | 6/1998 | Lnou 1Ppei | 345/104 |
| 5,774,571 A * | 6/1998 | Marshall | G06F 3/0346 382/119 |
| 5,793,361 A | 8/1998 | Kahn et al. | |
| 5,831,601 A | 11/1998 | Vogeley et al. | |
| 5,880,411 A | 3/1999 | Gillespie et al. | |
| 5,892,501 A | 4/1999 | Kim et al. | |
| 5,926,168 A * | 7/1999 | Fan | 345/158 |
| 5,930,326 A * | 7/1999 | Rothschild et al. | 378/57 |
| 5,949,052 A | 9/1999 | Longacre, Jr. et al. | |
| 5,949,402 A | 9/1999 | Garwin et al. | |
| 5,959,617 A * | 9/1999 | Bird | G06F 3/03542 345/182 |
| 6,028,649 A | 2/2000 | Faris et al. | |
| 6,081,255 A | 6/2000 | Narabu et al. | |
| 6,094,188 A | 7/2000 | Horton et al. | |
| 6,122,042 A | 9/2000 | Wunderman et al. | |
| 6,144,366 A | 11/2000 | Numazaki et al. | |
| 6,153,836 A * | 11/2000 | Goszyk | 178/19.01 |
| 6,184,863 B1 * | 2/2001 | Sibert et al. | 345/156 |
| 6,215,409 B1 * | 4/2001 | Blach | 340/815.4 |
| 6,232,937 B1 | 5/2001 | Jacobsen et al. | |
| 6,269,565 B1 | 8/2001 | Inbar et al. | |
| 6,288,710 B1 * | 9/2001 | Lee et al. | 345/173 |
| 6,300,986 B1 * | 10/2001 | Travis | G02F 1/011 348/E13.014 |
| 6,348,696 B1 * | 2/2002 | Alt et al. | 250/559.36 |
| 6,377,249 B1 | 4/2002 | Mumford | |
| 6,404,416 B1 | 6/2002 | Kahn et al. | |
| 6,437,314 B1 * | 8/2002 | Usuda et al. | 250/221 |
| 6,567,165 B1 * | 5/2003 | Tsuchiya et al. | 356/338 |
| 6,747,612 B1 * | 6/2004 | Knox | 345/8 |
| 6,788,295 B1 | 9/2004 | Inkster | |
| 6,839,523 B1 * | 1/2005 | Roberts | 398/177 |
| 6,879,354 B1 | 4/2005 | Sawayama et al. | |
| 6,891,530 B2 | 5/2005 | Umemoto et al. | |
| 6,972,401 B2 | 12/2005 | Akitt et al. | |
| 7,006,080 B2 | 2/2006 | Gettemy | |
| 7,030,782 B2 * | 4/2006 | Ely et al. | 341/20 |
| 7,166,966 B2 | 1/2007 | Naughler, Jr. et al. | |
| 7,435,940 B2 | 10/2008 | Eliasson et al. | |
| 7,450,105 B2 | 11/2008 | Nakamura et al. | |
| 7,477,241 B2 * | 1/2009 | Lieberman et al. | 345/175 |
| 7,499,040 B2 | 3/2009 | Zadesky et al. | |
| 7,629,967 B2 | 12/2009 | Newton | |
| 8,031,180 B2 | 10/2011 | Miyamoto et al. | |
| 8,207,484 B1 * | 6/2012 | Williams | 250/203.6 |
| 8,681,132 B2 | 3/2014 | Schobben et al. | |
| 2001/0031067 A1 | 10/2001 | Kennedy et al. | |
| 2001/0038065 A1 * | 11/2001 | Kimura | 250/208.1 |
| 2001/0050672 A1 | 12/2001 | Kobayashi | |
| 2002/0021287 A1 * | 2/2002 | Tomasi | G06F 1/1613 345/168 |
| 2002/0085164 A1 * | 7/2002 | Stanford-Clark | 349/167 |
| 2002/0097222 A1 * | 7/2002 | Nishino | 345/157 |
| 2003/0030003 A1 * | 2/2003 | Maekawa et al. | 250/367 |
| 2003/0096302 A1 * | 5/2003 | Yguerabide et al. | 435/7.1 |
| 2003/0107748 A1 * | 6/2003 | Lee | G06F 3/0325 356/614 |
| 2003/0179175 A1 * | 9/2003 | Shigeta et al. | 345/101 |
| 2003/0193796 A1 * | 10/2003 | Heeks | H01L 27/322 362/84 |
| 2004/0070565 A1 * | 4/2004 | Nayar et al. | 345/156 |
| 2004/0147294 A1 * | 7/2004 | Nuovo | 455/575.1 |
| 2004/0208396 A1 * | 10/2004 | Gunther et al. | 382/294 |
| 2004/0227734 A1 | 11/2004 | Chang et al. | |
| 2004/0233178 A1 * | 11/2004 | Silk et al. | 345/179 |
| 2004/0252091 A1 | 12/2004 | Ma | |
| 2004/0252867 A1 | 12/2004 | Lan et al. | |
| 2005/0024336 A1 * | 2/2005 | Xie et al. | 345/166 |
| 2005/0083531 A1 * | 4/2005 | Millerd et al. | 356/450 |
| 2005/0088646 A1 * | 4/2005 | Kong et al. | 356/70 |
| 2005/0105095 A1 * | 5/2005 | Pesach et al. | 356/432 |
| 2005/0110781 A1 * | 5/2005 | Geaghan et al. | 345/180 |
| 2005/0128190 A1 | 6/2005 | Ryynanen | |
| 2005/0133700 A1 * | 6/2005 | Buermann et al. | 250/221 |
| 2005/0156914 A1 | 7/2005 | Lipman et al. | |
| 2006/0004500 A1 * | 1/2006 | Lefaure | 701/29 |
| 2006/0043310 A1 * | 3/2006 | Arsenault et al. | 250/393 |
| 2006/0044283 A1 | 3/2006 | Eri et al. | |
| 2006/0250497 A1 * | 11/2006 | Inbar et al. | 348/31 |
| 2011/0122091 A1 * | 5/2011 | King et al. | 345/175 |
| 2013/0027361 A1 * | 1/2013 | Perski et al. | 345/178 |

FOREIGN PATENT DOCUMENTS

| | | | | |
|---|---|---|---|---|
| GB | 2289756 | | 11/1995 | |
| GB | 2299856 | | 10/1996 | |
| GB | 2389192 A | | 12/2003 | |
| JP | 08-050526 | | 2/1996 | |
| JP | 2002-207564 A | | 7/2002 | |
| WO | WO-95/02801 | | 1/1995 | |
| WO | WO-02/043045 | | 5/2002 | |
| WO | WO0247395 | * | 6/2002 | H04N 9/64 |
| WO | WO 03/044726 A1 | | 5/2003 | |
| WO | WO03/104965 | * | 12/2003 | G06F 3/033 |
| WO | WO 03/104965 | | 12/2003 | |
| WO | WO 03104965 | * | 12/2003 | G06F 3/033 |
| WO | WO 03104965 A2 | * | 12/2003 | G06F 3/0346 |

OTHER PUBLICATIONS

JPO Office Action, JP, dated Sep. 28, 2010, Tomoya, Hatori.

Dominessy, Mary E., "A Literature Review and Assessment of Touch Interactive Devices," U.S. Army Human Engineering Laboratory, Oct. 31, 1989, 36 pages, Aberdeen Proving Ground, Maryland, U.S.A.

Liu, Jin, et al., "Three-dimensional PC: toward novel forms of human-computer interaction," Three-Dimensional Video and Display: Devices and Systems SPIE CR76, Nov. 5-8, 2000, Boston, MA, U.S.A.

Paradiso, J.A., et al., "Sensor systems for interactive surfaces," IBM Systems Journal, Dec. 21, 2000, pp. 892-914.

Paradiso Joseph A., "Several Sensor Approaches that Retrofit Large Surfaces for Interactivity," Sep. 29, 2002, pp. 1-8.

* cited by examiner

CONTROL APPARATUS

CROSS REFERENCE TO PRIOR APPLICATION

The above referenced application is a National Phase of International Patent Application No. PCT/IL2005/000365, filed Apr. 1, 2005, which is incorporated by reference herein. The International application was published in English on Oct. 13, 2005 as WO 2005/094176 A2.

FIELD OF THE INVENTION

The present invention relates to interfaces generally and more particularly to user interfaces and control apparatus and methodologies for and for use with computerized devices, such as mobile communicators, televisions and personal computers.

BACKGROUND OF THE INVENTION

The following published patent documents, the disclosures of which are hereby incorporated by reference, are believed to represent the current state of the art:

Great Britain Patent Numbers: GB2299856 and GB2289756,

European Patent Number: EP0572182,

PCT Patent Application Publication Numbers: WO02/043045 and WO95/02801, and

U.S. Pat. Nos. 6,094,188; 6,081,255; 5,926,168; 5,892,501; 5,448,261; 5,227,985; 5,949,402; 5,959,617; 5,122,656; 5,506,605 and 4,320,292.

SUMMARY OF THE INVENTION

The present invention seeks to provide improved control apparatus and methodologies for and for use with computerized devices, such as mobile communicators, televisions and personal computers.

There is thus provided in accordance with a preferred embodiment of the present invention an interface apparatus including a panel defining at least one edge, at least one detector arranged along the at least one edge of the panel and an electromagnetic radiation beam emitter operative to direct at least one beam of electromagnetic radiation onto the panel from a variable distance and at a variable angle, the panel being operative to transmit electromagnetic radiation from the at least one beam impinging thereon to the at least one edge thereof, for detection by the at least one detector, the panel being operative to generally attenuate the electromagnetic radiation passing therethrough to the at least one edge as a function of the distance traveled by the electromagnetic radiation through the panel, whereby the at least one detector is operative to provide at least one output which can be used to determine the variable distance and the variable angle.

In accordance with a preferred embodiment of the present invention the panel includes a display. Preferably, the panel includes a mobile telephone display panel. Alternatively, the panel includes a hand-held computing device display panel. As a further alternative, the panel includes a television display panel. As yet a further alternative, the panel includes an input pad panel.

In accordance with another preferred embodiment of the present invention the at least one detector includes a generally linear array of detectors. Preferably, the at least one detector is capable of detecting the electromagnetic radiation at predetermined frequencies in at least one of visible and non-visible ranges.

In accordance with still another preferred embodiment of the present invention the electromagnetic radiation beam emitter is operative to provide a generally conical beam. Alternatively or additionally, the electromagnetic radiation beam emitter is operative to provide a plurality of beams. Preferably, the electromagnetic radiation beam emitter is operative to provide at least one generally collimated beam. Alternatively, the electromagnetic radiation beam emitter is operative to provide at least one beam having a generally asymmetrical cross section. As a further alternative, the electromagnetic radiation beam emitter is operative to provide at least one beam having a generally pyramidal shape. As yet a further alternative, the electromagnetic radiation beam emitter is operative to provide at least one beam having a generally polygonal cross section.

In accordance with a further preferred embodiment of the present invention the electromagnetic radiation beam emitter is operative to provide a modulated beam. Preferably, the electromagnetic radiation beam emitter is operative to provide a beam of visible light. Alternatively, the electromagnetic radiation beam emitter is operative to provide a beam of non-visible electromagnetic radiation.

In accordance with a still further preferred embodiment of the present invention the interface apparatus also includes detector output processing circuitry operative to receive at least one output of the at least one detector and to provide an output indication of at least one of location, orientation, shape and size of at least one impingement spot defined by impingement of the at least one electromagnetic radiation beam on the panel. Preferably, the interface apparatus also includes detector output processing circuitry operative to receive at least one output of the at least one detector and to provide an output indication of at least two of location, orientation, shape and size of at least one impingement spot defined by impingement of the at least one electromagnetic radiation beam on the panel.

In accordance with yet a further preferred embodiment of the present invention the interface apparatus also includes detector output processing circuitry operative to receive at least one output of the at least one detector and to provide an output indication of at least three of location, orientation, shape and size of at least one impingement spot defined by impingement of the at least one electromagnetic radiation beam on the panel. Preferably, the interface apparatus also includes detector output processing circuitry operative to receive at least one output of the at least one detector and to provide an output indication of location, orientation, shape and size of at least one impingement spot defined by impingement of the at least one electromagnetic radiation beam on the panel.

In accordance with another preferred embodiment of the present invention the interface apparatus also includes detector output processing circuitry operative to receive at least one output of the at least one detector and to provide an output indication of at least one of the location and angular orientation of the electromagnetic radiation beam emitter. Preferably, the interface apparatus also includes detector output processing circuitry operative to receive at least one output of the at least one detector and to provide an output indication of the location and angular orientation of the electromagnetic radiation beam emitter.

In accordance with yet another preferred embodiment of the present invention the interface apparatus also includes detector output processing circuitry operative to receive at least one output of the at least one detector and to provide an output indication of at least one of the location and angular orientation of the electromagnetic radiation beam emitter, the location being defined as a Z-distance between a plane of the panel along a line perpendicular thereto and a plane parallel to the plane of the panel in which a beam origin of the electromagnetic radiation beam emitter is located. Preferably, the interface apparatus also includes detector output processing circuitry operative to receive at least one output of the at least one detector and to provide an output indication of at least one of the location and angular orientation of the electromagnetic radiation beam emitter, the location being defined as a point-to-point distance between a beam origin of the electromagnetic radiation beam emitter and a center of an impingement location of the beam on the panel.

In accordance with an additional preferred embodiment of the present invention the interface apparatus also includes detector output processing circuitry operative to receive at least one output of the at least one detector and to provide an output indication of a trajectory of the electromagnetic radiation beam emitter. Preferably, the impingement of the beam on the panel provides a generally elliptical impingement spot. Additionally, the interface apparatus also includes analysis circuitry operative to determine a ratio of a major axis and a minor axis of the elliptical impingement spot, thereby to determine an angle of intersection between the beam and the panel. Additionally or alternatively, the interface apparatus also includes analysis circuitry operative to employ detected variations in intensity of the electromagnetic radiation at different locations on an impingement spot defined by impingement of the beam on the panel, thereby to assist in determination of an angle of intersection between the beam and the panel.

There is also provided in accordance with another preferred embodiment of the present invention an interface method including providing a panel defining at least one edge, at least one detector arranged along the at least one edge of the panel and an electromagnetic radiation beam emitter operative to direct at least one beam of electromagnetic radiation onto the panel from a variable distance and at a variable angle, directing the beam of electromagnetic radiation from the electromagnetic radiation beam emitter onto the panel, thereby producing at least one impingement spot, employing the panel to transmit electromagnetic radiation from the at least one impingement spot to the at least one edge thereof, the panel being operative to generally attenuate the electromagnetic radiation passing therethrough to the at least one edge as a function of the distance traveled by the electromagnetic radiation through the panel, detecting, by the at least one detector, the electromagnetic radiation transmitted by the panel to the at least one edge, and employing an output of the at least one detector to determine the variable distance and the variable angle.

In accordance with a preferred embodiment of the present invention providing the panel includes providing a display. Preferably, providing the panel includes providing a mobile telephone display panel. Alternatively, providing the panel includes providing a hand-held computing device display panel. As a further alternative, providing the panel includes a providing television display panel. As a still further alternative, providing the panel includes providing an input pad panel.

In accordance with another preferred embodiment of the present invention providing the at least one detector includes providing a generally linear array of detectors. Preferably, the detecting by the at least one detector includes detecting electromagnetic radiation at predetermined frequencies in at least one of visible and non-visible ranges. Additionally or alternatively, providing the electromagnetic radiation beam emitter includes providing and electromagnetic radiation beam emitter which is operative to provide a generally conical beam.

In accordance with yet another preferred embodiment of the present invention providing the electromagnetic radiation beam emitter includes providing and electromagnetic radiation beam emitter which is operative to provide a plurality of beams. Preferably, providing the electromagnetic radiation beam emitter includes providing and electromagnetic radiation beam emitter which is operative to provide at least one generally collimated beam. Alternatively, providing the electromagnetic radiation beam emitter includes providing and electromagnetic radiation beam emitter which is operative to provide at least one beam having a generally asymmetrical cross section. As a further alternative, providing the electromagnetic radiation beam emitter includes providing and electromagnetic radiation beam emitter which is operative to provide at least one beam having a generally pyramidal shape. As still another alternative, providing the electromagnetic radiation beam emitter includes providing and electromagnetic radiation beam emitter which is operative to provide at least one beam having a generally polygonal cross section.

In accordance with a further preferred embodiment of the present invention providing the electromagnetic radiation beam emitter includes providing and electromagnetic radiation beam emitter which is operative to provide a modulated beam. Preferably, providing the electromagnetic radiation beam emitter includes providing and electromagnetic radiation beam emitter which is operative to provide a beam of visible light. Alternatively, providing the electromagnetic radiation beam emitter includes providing and electromagnetic radiation beam emitter which is operative to provide a beam of non-visible electromagnetic radiation.

In accordance with a still further preferred embodiment of the present invention the interface method also includes providing detector output processing circuitry operative to receive at least one output of the at least one detector and to provide an output indication of at least one of location, orientation, shape and size of at least one impingement spot defined by impingement of the at least one electromagnetic radiation beam on the panel. Preferably, the interface method also includes providing detector output processing circuitry operative to receive at least one output of the at least one detector and to provide an output indication of at least two of location, orientation, shape and size of at least one impingement spot defined by impingement of the at least one electromagnetic radiation beam on the panel.

In accordance with yet a further preferred embodiment of the present invention the interface method also includes providing detector output processing circuitry operative to receive at least one output of the at least one detector and to provide an output indication of at least three of location, orientation, shape and size of at least one impingement spot defined by impingement of the at least one electromagnetic radiation beam on the panel. Preferably, the interface method also includes providing detector output processing circuitry operative to receive at least one output of the at least one detector and to provide an output indication of location, orientation, shape and size of at least one impingement spot defined by impingement of the at least one electromagnetic radiation beam on the panel. Additionally or alternatively, the interface method also includes providing detector output processing circuitry operative to receive at least one output of the at least one detector and to provide an output indication of at least one of the location and angular orientation of the electromagnetic radiation beam emitter.

In accordance with another preferred embodiment of the present invention the interface method also includes providing detector output processing circuitry operative to receive at least one output of the at least one detector and to provide an output indication of the location and angular orientation of the electromagnetic radiation beam emitter. Preferably, the interface method also includes providing detector output processing circuitry operative to receive at least one output of the at least one detector and to provide an output indication of at least one of the location and angular orientation of the electromagnetic radiation beam emitter, the location being defined as a Z-distance between a plane of the panel along a line perpendicular thereto and a plane parallel to the plane of the panel in which a beam origin of the electromagnetic radiation beam emitter is located. Alternatively, the interface method also includes providing detector output processing circuitry operative to receive at least one output of the at least one detector and to provide an output indication of at least one of the location and angular orientation of the electromagnetic radiation beam emitter, the location being defined as a point-to-point distance between a beam origin of the electromagnetic radiation beam emitter and a center of an impingement location of the beam on the panel.

In accordance with another further preferred embodiment of the present invention the interface method also includes providing detector output processing circuitry operative to receive at least one output of the at least one detector and to provide an output indication of a trajectory of the electromagnetic radiation beam emitter. Preferably, the interface method also includes providing a generally elliptical impingement spot by impingement of the beam on the panel. Additionally the interface method also includes providing analysis circuitry operative to determine a ratio of a major axis and a minor axis of the elliptical impingement spot and employing the analysis circuitry to determine an angle of intersection between the beam and the panel. Additionally or alternatively, the interface method also includes providing analysis circuitry operative to employ detected variations in intensity of the electromagnetic radiation at different locations on an impingement spot defined by impingement of the beam on the panel and employing the analysis circuitry to assist in determination of an angle of intersection between the beam and the panel.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
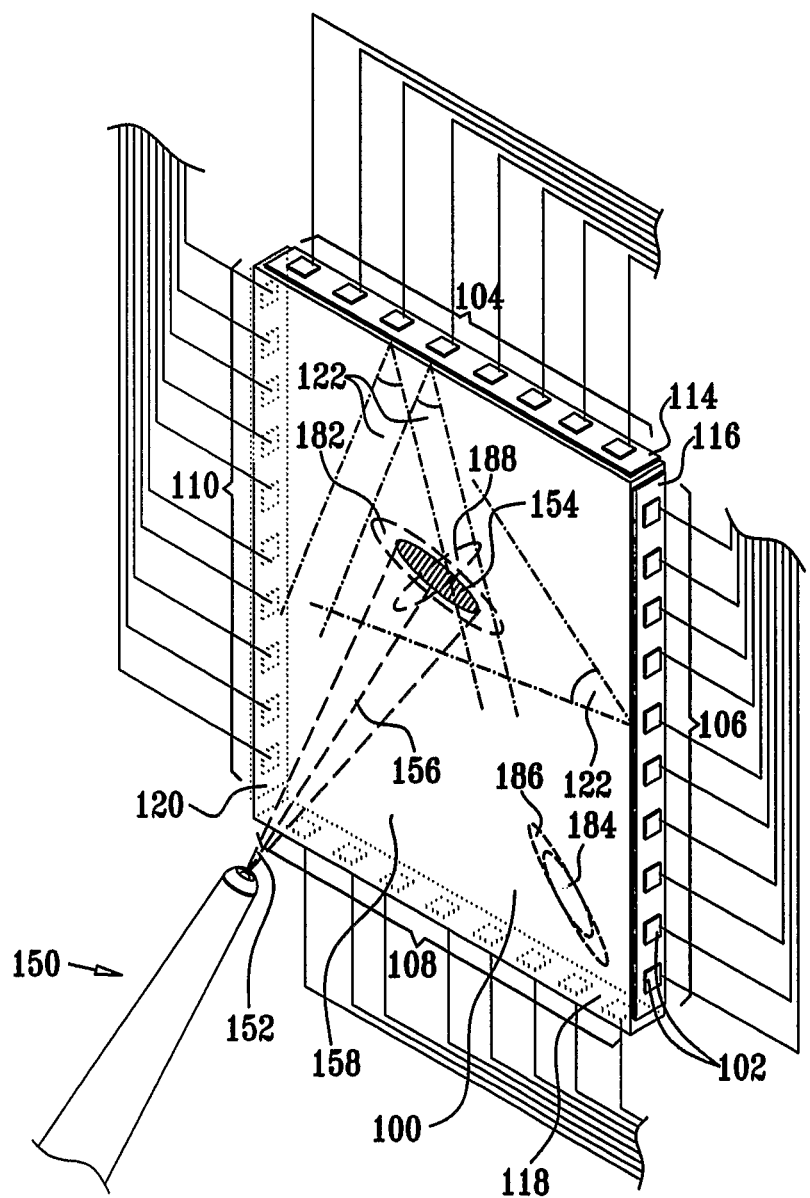
FIGS. 1, 2 and 3 are simplified pictorial illustrations of three alternative embodiments of the present invention.

There are many situations in which wireless remote control of equipment or data is particularly desirable. In many of these situations it would be particularly advantageous for control to be dependent on the spatial positioning or motion of a free moving control device relative to a display or panel related to the equipment.

Three-dimensional remote control may be particularly advantageous, for example, for improving the quality of life of severely disabled people. Such control may be used by people with severe mobility impairment, for operating special needs vehicles, household equipment, computers or the like. Three-dimensional remote control would allow the minimum effort with no pressure being required to operate switches or the like. Conveniently, the control device could be configured to the needs of the disabled person allowing him to wear the electromagnetic radiation-emitting portion of the device in a convenient position for mobility.

Three-dimensional remote control also has applications in three-dimensional design. It would be particularly beneficial, for example, for a designer to be able to create a 'virtual' 3D design by tracing a three-dimensional image in mid-air above a control panel in the form of a sensor plate. A computer design system integrating a wireless, freely held control device in the form of a stylus or the like would allow a more seamless, intuitive, and artistic effort.

It is an object of the invention to provide an improved control apparatus for the remote control of data or equipment.

According to one aspect of the invention, there is provided control apparatus for the remote control of data or equipment, comprising: a screen; an input device such as a stylus; sensing means for sensing data related to a position of the input device relative to the screen; control means for determining the position of the input device relative to said screen from the data; wherein, the input device includes a source of electromagnetic radiation for directing onto the screen; the sensing means includes detection means for detecting electromagnetic radiation directed onto, and scattered by the screen or by a scattering surface beneath a non-scattering screen; the detection means being configured to produce a detector output dependent on the scattered electro-magnetic radiation detected; and the control means being configured to analyze the detector output to determine the position of the source relative to the screen.

Preferably the source is configured to produce a conical beam of infrared radiation for directing onto the screen to form an elliptical area of incident radiation.

Alternatively, the source may be configured to produce multiple laser beams for directing onto the screen.

Preferably the control means is configured to analyze the detector output, to measure the length of at least one of a major axis or a minor axis of the incident elliptical area, and to calculate the distance between the source and the screen from said measured length.

Preferably the control means is configured to analyze the detector output to measure angle-related parameters of electromagnetic radiation directed by the source onto the screen, and to determine the angle of the source relative to screen from the measured parameters.

Preferably the area-related parameters include the length of at least one of a major axis or a minor axis of the incident elliptical area.

Preferably the source is configured to split the laser beam into a plurality of components for directing onto the screen to form a plurality of corresponding incident points.

Preferably the control means is configured to analyze the detector output to identify the surface pattern created by the incident points.

The control means may be configured to determine the distance of the source from the screen from the surface pattern.

The control means may be configured to determine the angle of the source relative to the screen from the surface pattern.

Preferably the detection means comprises a plurality of detectors arranged along at least one edge of the screen; each detector being configured to produce an analog output dependent on the quantity of scattered electromagnetic radiation detected by it. Typically, the detection means' reception frequency corresponds to that of the emitter.

Preferably the detection means is configured to produce detector output in the form of a digital signal, and the detection means further comprises a converter configured to convert the analog outputs into the digital signal.

According to another aspect of the invention, there is provided a method of determining a position of an input device relative to a screen comprising: directing electromagnetic radiation onto the screen from the input device; detecting electromagnetic radiation directed onto, and scattered by the screen; producing a detector output dependent on scattered electromagnetic radiation detected; and analyzing the detector output to determine the position of the input device relative to the screen.

Electronic devices which may embody the present invention may be, for example, a hand-held or "palm-top" computer, a personal digital assistant (PDA), a PC screen, or a mobile communication device such as a mobile telephone. Alternatively the device may be an electronic control panel for controlling electronic equipment such as surgical apparatus, an electric vehicle or the like. Such devices each preferably include a screen for displaying data, or control options for controlling electronic equipment. In operation, the data displayed or the electronic equipment is controlled by means of an input device. In the preferred embodiment the input device takes the form of a pointer, which may be of any suitable form, for example a pen-shaped "stylus", a glove, a visor, a gun, or any suitable remote unit. The pointer allows the user to operate the device by selecting various options displayed on the screen.

The screen preferably is made of a relatively transparent material with small but significant scattering properties, for example, commercial grade Perspex or the like. Hence, in operation, when the pointer emits a beam of electromagnetic radiation onto a region of the screen, most of the electromagnetic radiation incident on the screen is transmitted through the screen, and some of the electromagnetic radiation is scattered towards the edges of the screen. The quantity of transmitted electromagnetic radiation passing through the screen typically decreases exponentially with the thickness of-the screen. The scattered light arriving at the edges of the screen spreads over an increasing area with increasing distance from the region of incidence to the edges of the screen. The light arriving at an edge at distance L from the region of incidence is proportional to (exp−aL)/L. a is the scattering coefficient of the screen.

Preferably associated with the screen are a plurality of detectors arranged along the edges of the screen in the x and y directions respectively. The detectors are configured to detect the scattered electromagnetic radiation, and typically have a relatively narrow field of view, for example ~8°. They may be of any form suitable for detecting electromagnetic radiation of the type emitted by the pointer, and may be, for example, conventional photo detectors.

The pointer is provided with a source of electromagnetic radiation, for example an infrared emitter, a laser, an LED or other such light-emitting device.

According to one embodiment, the pointer emits a conical beam of electromagnetic radiation from a circular, spherical, or other shaped tip (not shown). The light preferably is modulated in order to avoid interference from ambient light.

In operation, when the pointer emits a beam of electromagnetic radiation onto a region of the screen, each detector detects a portion of the electromagnetic radiation scattered from the incident beam and produces a corresponding analog output with a magnitude dependent on the quantity of scattered electromagnetic radiation detected. The analog outputs preferably are received by a converter, which produces a corresponding serial output. The serial output is inputted to a device which analyses the signal to determine the emitter's electromagnetic radiation propagation pattern upon the screen and thereby derive the pointer parameters, for example the relative X, Y and Z position and/or angle of inclination of the pointer.

The converter is of any suitable type and may be an analog-to-digital converter. The serial output may be in the form of a digital serial signal or an analog serial signal.

The x and y detectors with the highest magnitude analog output generally correspond respectively to the x and y positions of the center of the incident beam. Hence, in operation, the electronic device measures the magnitude of the analog outputs, determines the x and y position of the incident beam from the measured values, and responds appropriately.

In operation, the accuracy of the position determined may be improved by interpolation between the values of the outputs measured for multiple detectors. In each direction, the value measured for the detector with the highest magnitude output is interpolated with the values measured for adjacent detectors using a polynomial function. The polynomial function is quadratic having the form:

$$V(x)=ax^2+bx+c \text{ for the } x \text{ direction}$$

and $$v(y)=a'y^2+b'y+c' \text{ for the } y \text{ direction}$$

where the functions V(x) and V(y) are the values of the outputs of the detectors at position x and position y respectively. The constants a, a', b, b' and c, c' are determined by finding the best fit to the measured values. The interpolated best value is approximated by:

$$x=-b/2a \text{ for the } x \text{ position}$$

and $$y=-b'/2a' \text{ for the } y \text{ position}$$

Hence, a more accurate value of x and y position are found.

It is appreciated that the quadratic model described hereinabove is only one of a variety of models.

The region of the screen on which the electromagnetic radiation is incident will be substantially elliptical with an area dependent upon the distance of the pointer from the screen. The eccentricity of the ellipse will depend on the angle at which the beam strikes the screen and hence on the angle at which the pointer is held. An eccentricity of 0, for example, is indicative of a circle of incident electromagnetic radiation and the pointer being held perpendicular to the surface of the screen.

The relative magnitudes of the analog outputs are used to determine the lengths of the major and minor ellipse axes and hence the eccentricity of the ellipse. The angle of the pointer is then calculated using conventional mathematics. Similarly the parameters a and a' of the parabolas defined hereinabove are inversely proportional to the ellipse size, and are used to calculate the perpendicular distance of the pointer from the screen in the Z direction. Where the ellipse is a circle, the length of both ellipse axes will be equal, corresponding to the diameter d of a circle.

The ratio of the constants a to a' derived from the interpolation is also a measure of the angle of the pointer relative to the screen. Hence, in operation the constants derived from interpolation may also be used to improve the accuracy of the angle determined.

The intensity of the electromagnetic radiation incident on the screen is also dependent on the distance of the pointer from the screen. Correspondingly, the quantity of scattered electromagnetic radiation detected by the detectors, and hence the magnitudes of the analog signals vary with the intensity of the incident electromagnetic radiation. Hence, the absolute magnitudes of the analog signals may also be used, either to independently determine the line-of-sight distance of the pointer from the screen, or to refine the result of the calculation based on the ellipse measurements.

The distance of the pointer from the screen is also generally inversely proportional to the constants a and a' derived from the interpolation. Hence, in operation the constants derived from interpolation may also be used to improve the accuracy of the z position determined.

The location and angle of the pointer may also be used to determine when the user makes a selection without physical contact between the pointer and the screen. A simple dipping motion, for example, could be used to represent the selection. Alternatively or additionally, the area and/or intensity of the light may also be used to represent a contactless selection. Such a selection may be indicated, for example, by the area of incident electromagnetic radiation falling below a certain minimum threshold and/or the intensity rising above a certain maximum threshold.

According to another embodiment of the invention, the pointer includes a laser source, three beam splitters and a window. The laser source may be of any suitable type, for example, a laser diode or the like.

The laser source preferably is located within the pointer and is configured to produce a laser beam in an axial direction. The beam splitters are preferably in the form of planar, semi-reflecting mirrors arranged within the pointer at intervals along the operational path of the laser beam. Each beam splitter is positioned at an angle $\alpha/2$ relative to the axial direction of the laser beam. Hence, in operation each beam splitter splits the laser beam into a first component, which passes through the splitter with no change in direction, and a second component, which is deflected through an angle $\alpha$.

The first, second and third beam splitters are located progressively further from the laser source. The second and third beam splitters are respectively rotated through 120°, and −120°, relative to the first beam splitter about the axial direction of the laser beam. Hence, in operation the laser source produces the laser beam, which passes through each beam splitter, in turn. Thus, the beam is split into four components comprising three deflected components and a transmitted component.

In operation, the deflected components incident on the screen, form the vertices of a triangle. The incident transmitted component lies substantially at the centre of the triangle. Each beam splitter may be made of any suitable material, for example, microscope cover glass. The splitters preferably are each provided with a thin-film optical interference coating for controlling the relative transmittance and reflectance of each splitter and hence the relative intensity of the deflected and transmitted components. Alternatively or additionally the pointer may be provided with an absorbing filter located in the operational path of the transmitted component for attenuating the intensity of the transmitted component relative to the deflected components.

Alternatively, a diffractive screen may replace the mirror assembly.

Thus, in operation, the intensity of the transmitted component is different to the intensity of the deflected components. Hence, when the components of the laser beam are incident on the screen, the transmitted component can be distinguished from the deflected components.

By way of example, when the beam splitters are made of microscope cover glass and $\alpha$ is set to approximately 13°, the associated ratio of transmittance to reflectance is approximately 1:1. Hence, the intensity of the transmitted component emerging from the third beam splitter is approximately: 25% of the intensity of the first deflected component deflected by the first beam splitter; 50% of the intensity of the second deflected component deflected by the second beam splitter and equal to the intensity of the third deflected component deflected by the third beam splitter. The absorbing filter reduces the intensity of the transmitted component further so that it is less than that of the other components.

A window may be located at the end of the pointer in the operational path of the transmitted component of the laser beam. The window is of suitable size and configuration to allow passage of all three deflected components and the transmitted component during operation.

The use of a laser source is particularly advantageous for operation of the device from a distance, since laser beams have extremely narrow spreads and maintain a relatively high intensity over long distances. It will be appreciated that the precise location and arrangement of the laser source and beam splitters may vary dependant on requirements. For example, where remote operation is required from a distance, the angle $\alpha$ may be particularly acute.

Operation to determine the three-dimensional position and orientation of the pointer employing multiple laser beams is similar to that described for the pointer having a conical beam.

The distance between the transmitted and deflected components incident on the screen is determined from their relative positions and hence the distance in the Z direction can also be determined by conventional trigonometry.

The relative distances between the transmitted and deflected components incident on the screen is indicative of the equality of the triangle formed by the incident deflected components. For example, when the pointer is held with the transmitted component perpendicular to the screen, the triangle formed by the deflected components is substantially equilateral. When the transmitted component is not normal to the screen, the triangle formed is not equilateral and the distances between the components reflect this. Hence, the angle at which the pointer is being held relative to the screen is determined using conventional trigonometry.

Repetitive calculation of the pointer position several times a second as the pointer is moved, allows a pointer trajectory to be recorded. The pointer trajectory may then be used to assist in anticipating the intentions of the user or for advanced control functions.

The location and angle of the pointer may also be used to determine when the user makes a selection without physical contact between the pointer and the screen. A simple dipping motion, for example, could be used to represent the selection.

It will be appreciated that although the invention has been described hereinabove with reference to an embodiment in which the three-dimensional position of a pointer may be determined, the invention is equally applicable for determining the position of the pointer in two dimensions only, or even a single dimension.

It will further be appreciated that although the invention has been described with reference to particular applications, there are numerous other ways in which the invention may be applied. A number of applications will now be described for the purposes of illustration.

The invention has particular application in the medical profession, for example, for computer-aided surgical procedures such as laparoscopy, microsurgery, and endoscopy. In these cases, the light source could be built into tip of a pointer in the form of a scalpel or other tool for a more natural feel for a doctor or surgeon.

In telemedicine the invention may be used for the control of cameras and medical equipment in remote medical examinations or procedures.

The invention may also be incorporated into equipment for training purposes. For example, it would be particularly beneficial in medical student training, for allowing simulated medical procedures to be carried out on computerized dummies such as CPR training mannequins or using other computer controlled simulators. A pointer in the form of a light-tipped surgical tool could be used to enhance the realism of the simulation making it more effective. Potentially such use could also reduce the requirements for cadavers in medical training.

The invention would also be of advantage in applications where there is a requirement for the human operation of equipment based in hazardous environments such as the vacuum of space or military settings. Examples of such uses include the intuitive control of unmanned equipment and the external repair and adjustment of space-based vehicles and equipment. A single hardware system could therefore be programmed with separate programming preferences for each piece of equipment, minimizing weight and equipment limitations on board.

The invention also has many applications in small-scale research, engineering and manufacturing including biotechnology, biology, semiconductors and nanotechnology. In situations where the operator is working with items too small to be seen by the naked eye, a system can be devised to integrate the pointer with a computerized microscope, for example, an electron-microscope or the like. The microscopic real-time image can then be used in conjunction with the pointer to control the microscope and to guide manipulate a 'workpiece'. In this application it would be particularly beneficial if the light source were a laser, since this can be focused extremely precisely.

Beneficial functionality may include, for example, simultaneous zoom control in conjunction with active functions in a single wireless pointer in the form of a stylus or other tool, the pointer being used directly "on" a microscope image for designing microchips, or investigating viruses or genes.

The invention may also be incorporated into equipment for fertility treatments, such as ICSI (intracytoplasmic sperm injection). In ICSI, a microscopically tipped pipette is used to select a single sperm and to inject it into an egg. Having the pipette controlled by an operator holding a pointer in the form of a computer-driven, light-tipped "pipette" and working directly on the microscope-generated image would have obvious advantages. The same principle applies to ex-vivo treatment (IVF), colonoscopy, and other invasive biopsy investigations, where trauma to a patient needs to be minimized.

In all these situations, the pointer is a hand-held tool which does not come into direct contact with the work in progress. This allows appropriate preferences and tolerances to be set to reduce the probability and magnitude of errors caused by under-compensation, over-compensation or undesirable movements.

A further application of the invention is for the enhanced control of televisions and other entertainment equipment. An electromagnetic radiation-sensitive screen in combination with an appropriately configured pointer could be used in a way similar to current remote-control systems, but with additional enhancements. For example, adjustability of a "frame within a frame" could be provided with "click and drag" being used to adjust the size of the second frame. Similarly, provision could be made for direct on-screen programming of a VCR, other recording device or integrated media.

A particular advantage in these applications is the provision of button-free menu operation, allowing for a more user-friendly and truly interactive procedure.

Figure 2:
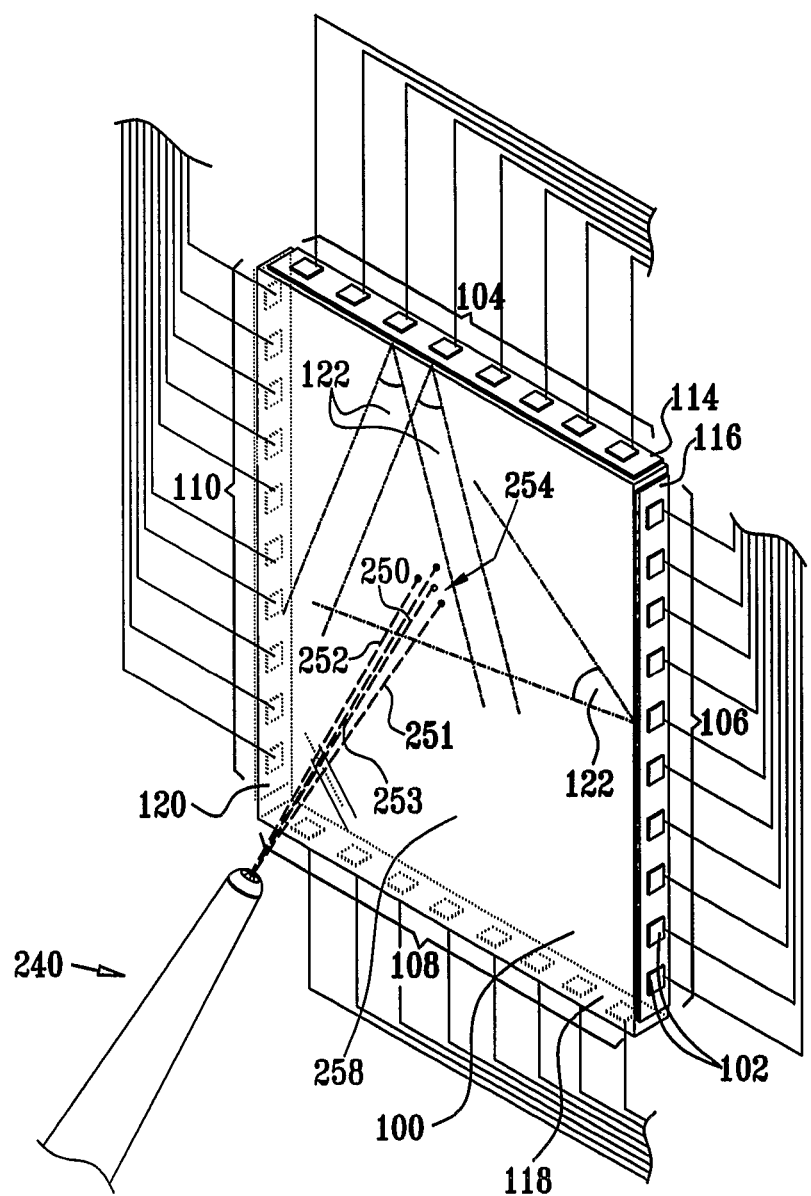
Figure 3:
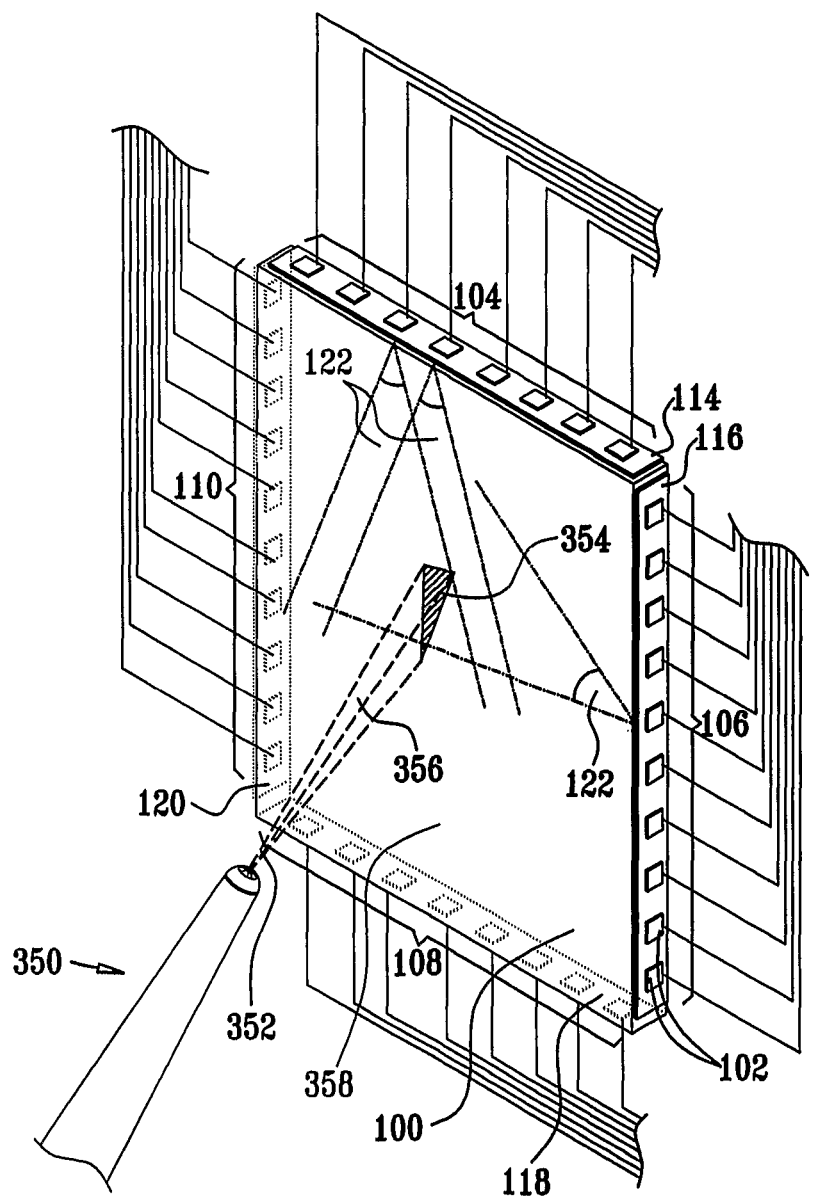

Reference is now made to FIGS. 1, 2 and 3, which are simplified pictorial illustrations of three alternative embodiments of the present invention. FIGS. 1, 2 and 3, each show a panel 100, preferably a generally planar element which is preferably but not necessarily part of a display screen. For example, the panel 100 may be a plastic protective cover over a solid state display, such as a liquid crystal or VGA display in a cellular telephone or PDA, a portion of a touch-screen or a phosphor-backed glass panel of a CRT display.

Panel 100 may be made of any suitable material, and is typically formed of a glass or plastic substrate, such as Plexiglas and need not necessarily be rigid. Alternatively, a transparent non-scattering element in contact with a Lambertian surface may be employed. Panel 100 is preferably characterized in that it transmits electromagnetic radiation impinging thereon to edges thereof. The panel generally attenuates the electromagnetic radiation passing therethrough to the edges thereof as a function of the distance traveled by the electromagnetic radiation through the panel.

Provided along at least one and preferably all edges of panel 100 are a plurality of electromagnetic energy detectors 102, such as PIN photodiodes, which are preferably arranged in spaced linear arrays, here generally designated by reference numerals 104, 106, 108 and 110 disposed along respective edges 114, 116, 118 and 120 of panel 100. Portions of edges 114, 116, 118 and 120 may be covered or coated other than at detectors 102, to help define and narrow the fields of view of the individual detectors 102.

Detectors 102 are preferably selected such that each has a field of view having an angular region of coverage of approximately 8 degrees, and such that if necessary, apart of the region of coverage of each detector can be masked, in order to achieve reduction in overlap between regions of coverage. Detectors 102 are preferably arranged and spaced such that generally the entire area of the panel 100 is covered by the field of view of at least one detector 102. The fields of view of a few of detectors 102 are illustrated in dashed lines and designated by reference numeral 122.

By virtue of the distance dependent electromagnetic radiation attenuation provided by panel 100, the relative amplitudes of the outputs of the detectors along multiple edges can be used to provide an output indication of the impingement location of a beam of light on the panel 100. The amplitudes of the outputs of the detectors can also be employed to indicate the area of a beam of electromagnetic radiation impinging on the panel, as well as its intensity.

The outputs of each of the detectors 102 are preferably multiplexed by detector output multiplexing circuits. It is appreciated that in certain applications, detectors 102 need not be provided along each edge of the panel, but it may be sufficient for detectors 102 to be provided along two generally orthogonal edges thereof. Preferably, however, detectors 102 are provided along all edges of the panel in order to maximize the signal-to-noise performance of the device.

A light pen or other suitable electromagnetic radiation emitter is employed to produce a beam of electromagnetic radiation which impinges on the panel 100. As will now be described, the location of the light pen and the angular orientation of the beam of electromagnetic radiation produced thereby relative to the panel can be determined from the outputs of the detectors.

The location of the light pen may be expressed as a Z-distance between a plane of the panel 100 along a line perpendicular thereto and a plane parallel to the plane of the panel in which the tip of a light pen is located. The location of the light pen may also be expressed as a point-to-point distance between the tip of the light pen and the center of the impingement location of the electromagnetic radiation beam on the panel 100.

Turning to FIG. 1, a light pen 150 is shown emitting a generally conical beam 152 which impinges on panel 100 and defines an impingement spot 154 thereon. As seen in FIG. 1, the electromagnetic radiation beam 152 has a beam axis 156 which is angled with respect to a generally planar element 158 by a non-90 degree angle. The impingement spot 154 forms generally an ellipse whose major axis and minor axis intersect at the intersection of beam axis 156 and generally planar element 158. Were the beam axis 156 to be arranged at a 90-degree angle to the generally planar element 158, the impingement spot 154 would have the shape of a circle, which is a degenerate case of an ellipse, and the center of the circle would lie at the intersection of beam axis 156 and generally planar element 158.

It is a particular feature of the present invention that the outputs of detectors 102 on at least two orthogonal edges 114 and 116 and preferably the outputs of detector arrays 104, 106, 108 and 110 along respective orthogonal edges 114, 116, 118 and 120, provide information as to the location, orientation, shape and size of the impingement spot 154.

As described hereinbelow with reference to FIG. 8, the processing circuitry of the present invention preferably provides combined outputs of detectors lying along each edge of the panel. These outputs can be employed to provide information regarding location, orientation, shape and size of impingement spot 154 on panel 100 produced by impingement thereon of beam 152 of electromagnetic radiation produced by an electromagnetic radiation emitter 150.

It is appreciated that the outputs of detectors 102 provide information to distinguish between impingement spots having different locations, orientations, shapes and sizes. For example, when comparing impingement spots 154 and 182 in FIG. 1, it is appreciated that a change in the size of the spot produces a corresponding change in the combined outputs of detectors 102, such as in the breadths and peak intensities thereof. As another example, when comparing impingement spots 154 and 184 in FIG. 1, it is appreciated that a change only in the location of the spot produces a corresponding change in the combined outputs of detectors 102, such as in the location of the center of the peak thereof and in the relative intensities sensed by detectors located at opposite edges of the panel 100.

As a further example, when comparing impingement spots 154 and 186 in FIG. 1, it is appreciated that a change in the shape of the spot produces a corresponding change in the combined outputs of detectors 102, such as in the relative breadths and intensities thereof. As an additional example, when comparing impingement spots 154 and 188 in FIG. 1, it is appreciated that a change in the orientation of the spot produces a corresponding change in the combined outputs of detectors 102, such as in the relative breadths, peak intensities and symmetries as sensed by detectors located at opposite edges of the panel 100.

It is appreciated that the different intensities of radiation at different sides of the ellipse are indicative of the angular orientation of the beam 152, and may be used to calculate the angle at which beam is directed at panel 100.

It is appreciated that variations in location, orientation, shape and size of the impingement spot correspond to variations in the three-dimensional orientation and three-dimensional location of the light pen 150. This is due, inter alia, to the facts that the ratio of the lengths of the major and minor axes of an ellipse are unique to an angle of intersection of a plane and a cone, and that for each such angle, the size of the ellipse is related to the distance between the vertex of the cone and the plane.

Turning to FIG. 2, a light pen 240 is shown emitting a plurality of generally collimated beams 250,251,252 and 253, such as non-mutually parallel laser beams, which impinge on panel 100 and define an impingement pattern 254 thereon. As seen in FIG. 2, the light beams 250, 251, 252 and 253 are directed non-perpendicularly with respect to a generally planar element 258. The impingement pattern 254 defines the vertices and the center of a triangle, the center of the triangle being defined by impingement of beam 250 onto generally planar element 258. Were the beam 250 to be arranged at a 90-degree angle to the generally planar element 258, the impingement pattern 254 would define the shape of an equilateral triangle.

It is a particular feature of the present invention that the outputs of detectors 102 on at least two orthogonal edges 114 and 116 and preferably the outputs of detector arrays 104, 106, 108 and 110 along respective orthogonal edges 114, 116, 118 and 120, provide information as to the location, orientation, shape and size of the triangle defined by the impingement pattern 254.

It is appreciated that the outputs of detectors 102 provide information to distinguish between the impingement patterns having different locations, orientations, shapes and sizes. It is appreciated that a change in any one or more of location, orientation, shape and size of the pattern produces a corresponding change in the combined outputs of detectors 102, such as in the distributions and configurations thereof.

It is appreciated that variations in location, orientation, shape and size of the impingement pattern, correspond to variations in the three-dimensional orientation and three-dimensional location of the light pen 240. This is due, inter alia, to the fact that the geometrical relationship of the vertices of the triangle correlate with an angle of intersection of the collimated beams and the panel 200. The size of the triangle is related to the distance between the emission point of the electromagnetic radiation and the plane of the panel.

Turning to FIG. 3, a light pen 350 is shown emitting an asymmetrical, generally triangular pyramidal beam 352 which impinges on panel 100 and defines an impingement spot 354 thereon. As seen in FIG. 3, the light beam 352 has a beam axis 356 which is angled with respect to a generally planar element 358 by a non-90 degree angle. The impingement spot 354 is a triangle whose center lies at the intersection of beam axis 356 and generally planar element 358. Were the beam axis 356 to be arranged at a 90-degree angle to the generally planar element 358, the impingement spot 354 would have a predetermined desired triangular shape and the center of the triangle would lie at the intersection of beam axis 356 and generally planar element 358.

It is a particular feature of the present invention that the outputs of detectors 102 on at least two orthogonal edges 114 and 116 and preferably the outputs of detector arrays 104, 106, 108 and 110 along respective orthogonal edges 114, 116, 118 and 120, provide information as to the location, orientation, shape and size of the impingement spot 354.

It is appreciated that the outputs of detectors 102 provide information to distinguish between the impingement spots having different locations, orientations, shapes and sizes. It is appreciated that a beam having asymmetrical properties may be employed in order to further enhance the detectability of changes in angular orientation of an electromagnetic radiation emitter.

Figure 4A:
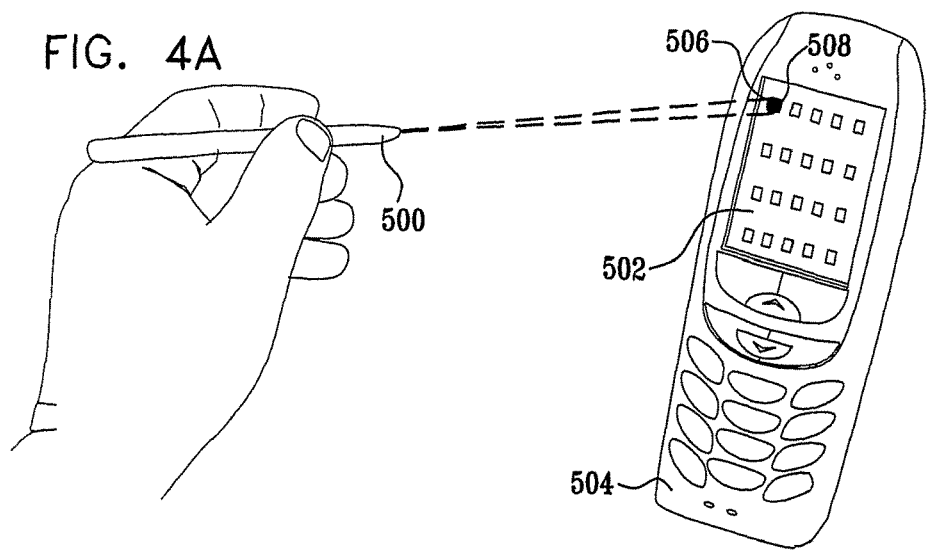
FIGS. 4A, 4B & 4C are simplified pictorial illustrations of operation of an embodiment of the present invention implemented in and in association with a mobile telephone.
Figure 4B:
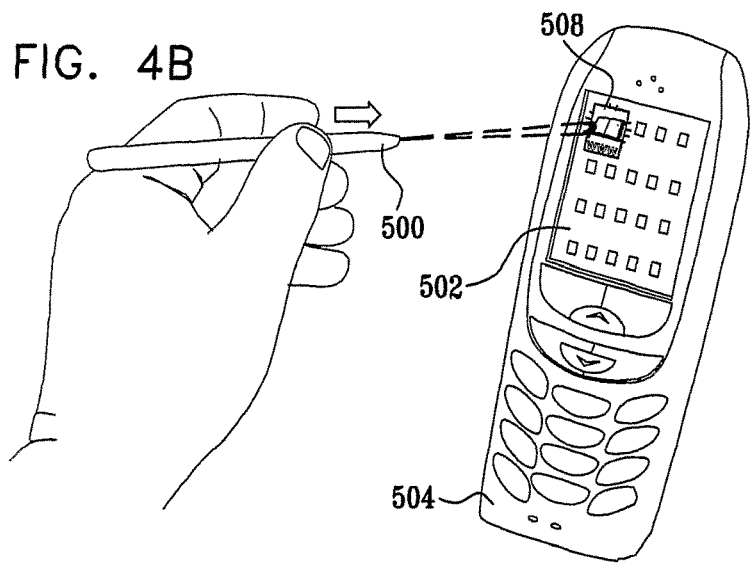
Figure 4C:
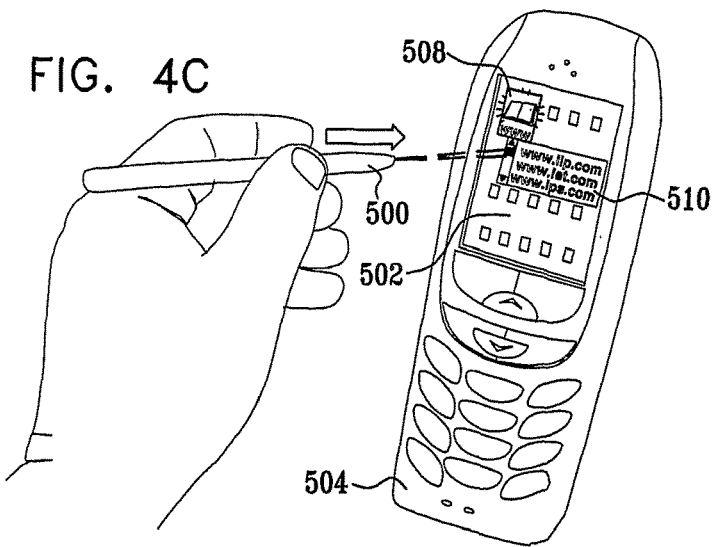

Reference is now made to 4A, 4B and 4C which illustrate operation of an embodiment of the present invention implemented in and in association with a mobile telephone. In the illustrated embodiment, a light pen 500 providing a generally conical beam is employed, it being appreciated that any other suitable beam configuration may be employed. FIGS. 4A-4C show that the user interface of the present invention is responsive to the distance of the light pen 500 from a display panel 502 of a mobile telephone 504 by sensing the size of an impingement spot 506 thereon, which size is directly related to the distance.

FIG. 4A shows the light pen 500 being held relatively far from the display panel 502 and providing a relatively large impingement spot 506 which is located on an application icon 508, preferably resulting in highlighting that icon. FIG. 4B shows the light pen 500 having been moved closer to the display panel 502 and thus providing a relatively smaller impingement spot 506 located on the icon 508, preferably providing a zoom-in function, resulting in enlarging of the highlighted icon 508. FIG. 4C shows the light pen 500 having been moved even closer to the display panel 502 and thus providing an even smaller impingement spot 506 located on icon 508, resulting in selection of the application represented by the highlighted icon 508 and presenting a menu 510 for operation of the application.

Figure 5A:
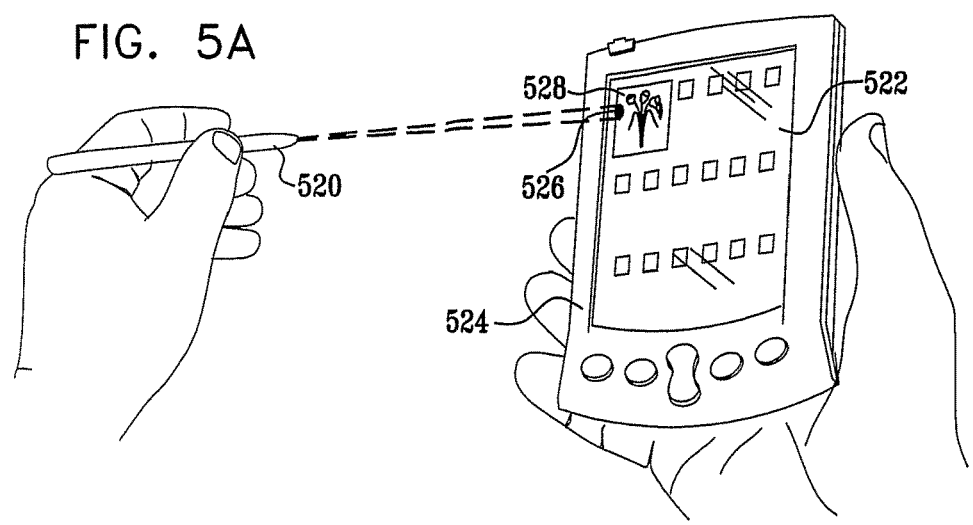
FIGS. 5A, 5B & 5C are simplified pictorial illustrations of operation of an embodiment of the present invention implemented in and in association with a personal digital assistant.
Figure 5B:
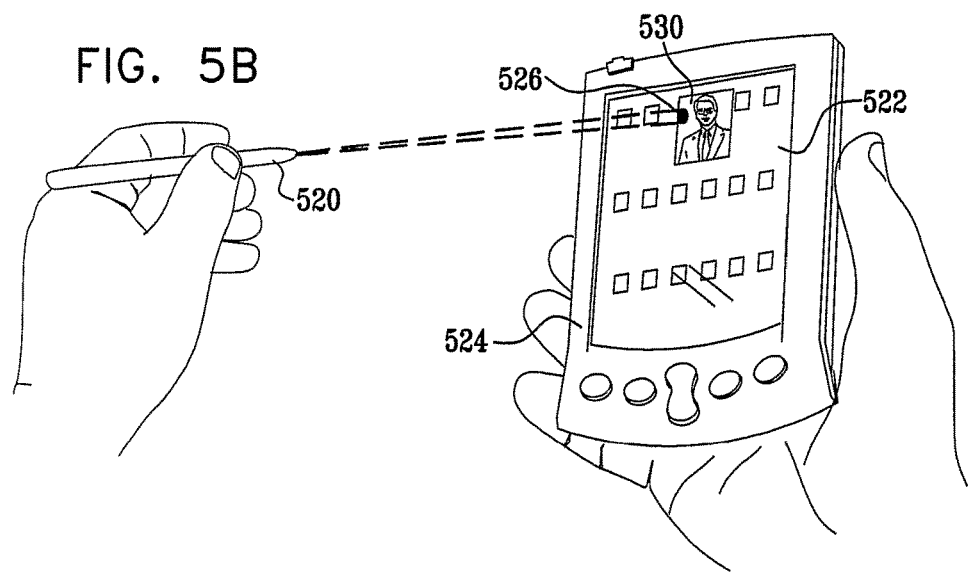
Figure 5C:
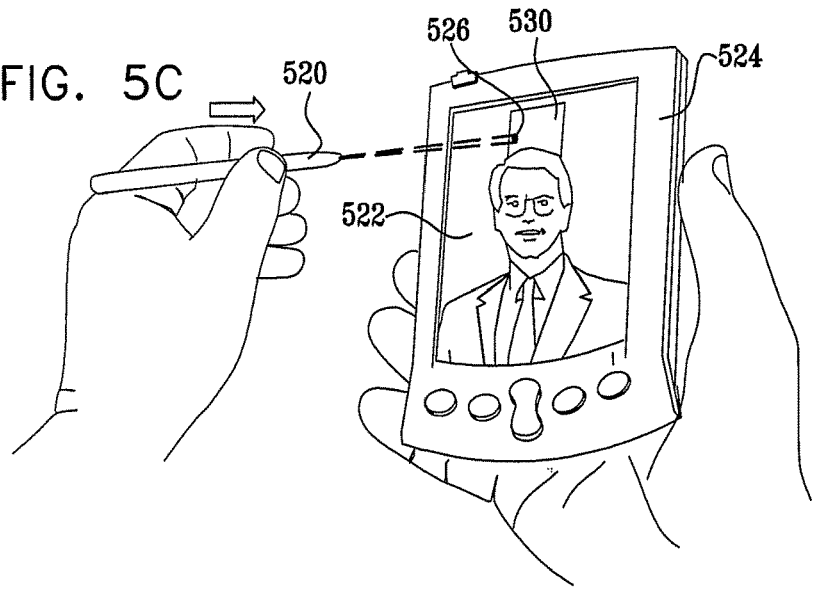

Reference is now made to 5A, 5B and 5C which illustrate operation of an embodiment of the present invention implemented in and in association with a hand-held computing device, such as a personal digital assistant. In the illustrated embodiment, a light pen or other electromagnetic radiation beam emitter 520 providing a generally conical beam is employed, it being appreciated that any other suitable beam configuration may be employed. FIGS. 5A-5C show that the user interface of the present invention is responsive to the location of impingement of an electromagnetic light beam produced by a light pen 520 on a display panel 522 of a personal digital assistant 524 as well as the distance of the light pen 520 from the display panel 522, which is determined by sensing the size of an impingement spot 526 thereon, which size is directly related to the distance.

FIG. 5A shows the light pen 520 being held relatively far from the display panel 522 and providing a relatively large impingement spot 526 which is located on an picture thumbnail 528, preferably resulting in operation of a moderate zoom-in function on that thumbnail. FIG. 5B shows the light pen 520 having been moved to a different thumbnail 530 on the display panel 522 preferably providing a moderate zoom-in function on thumbnail 530. FIG. 5C shows the light pen 520 having been moved closer to the display panel 522 and thus providing a smaller impingement spot 526 located on thumbnail 530, providing a maximum zoom-in function on thumbnail 530.

Figure 6A:
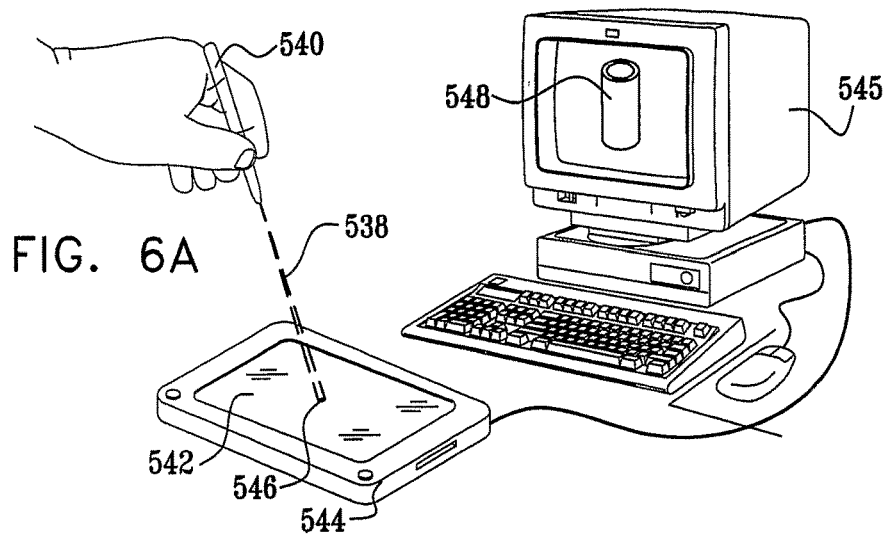
FIGS. 6A, 6B & 6C are simplified pictorial illustrations of operation of an embodiment of the present invention implemented in and in association with an input tablet.
Figure 6B:
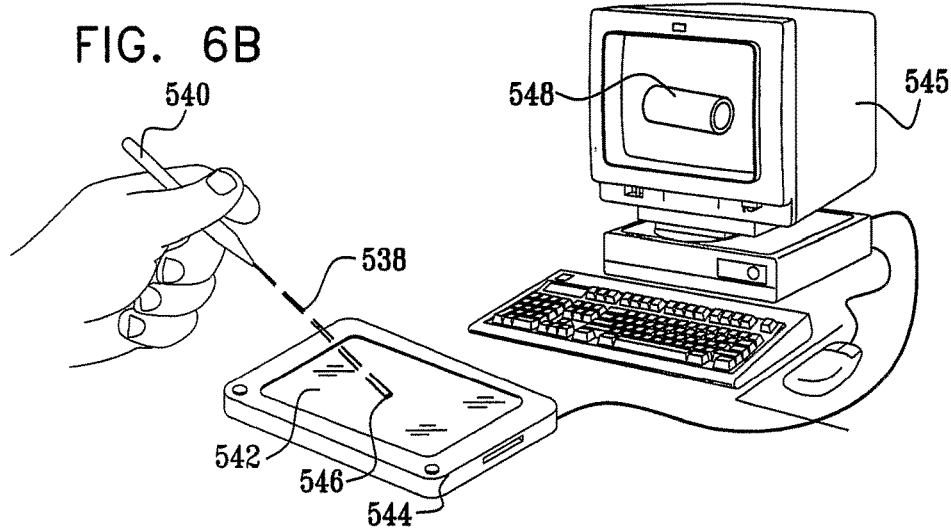
Figure 6C:
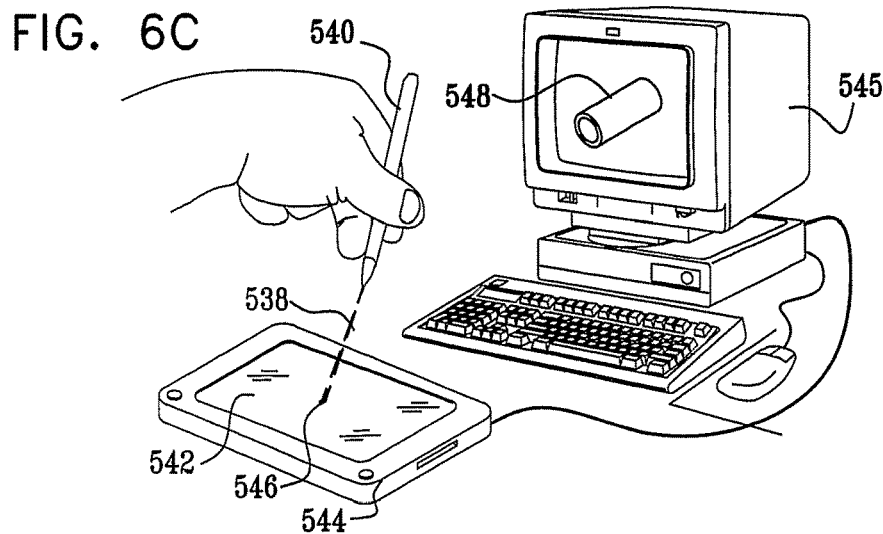

Reference is now made to 6A, 6B and 6C which illustrate operation of an embodiment of the present invention implemented in and in association with a computer input device such as an input tablet. In the illustrated embodiment, a light pen or other electromagnetic radiation beam emitter providing a generally conical beam is employed, it being appreciated that any other suitable beam configuration may be employed. FIGS. 6A-6C show that the user interface of the present invention is responsive to the angular orientation an electromagnetic light beam 538 produced by a light pen 540 on a panel 542 of an input tablet 544, associated with a computer 546. The angular orientation is determined by sensing the eccentricity of an impingement spot 546 on the panel 542, which eccentricity is directly related to the angular orientation of the beam 538.

FIG. 6A shows the light pen 540 being held at a first three-dimensional angular orientation relative to the panel 542, preferably resulting in presentation of an object 548, such as a cylinder, in a first three-dimensional orientation. FIG. 6B shows the light pen 540 having been moved to a second three-dimensional angular orientation relative to panel 542, preferably resulting in presentation of object 548 in a second three-dimensional orientation, which is preferably rotated relative to the first three-dimensional orientation thereof by an amount identical or otherwise correlated to the angular difference between the first and second three-dimensional angular orientations of the light pen 540.

FIG. 6C shows the light pen 540 having been moved to a third three-dimensional angular orientation relative to panel 542, preferably resulting in presentation of object 548 in a third three-dimensional orientation, which is preferably rotated relative to the second three-dimensional orientation thereof by an amount identical or otherwise correlated to the angular difference between the second and third three-dimensional angular orientations of the light pen 540.

Figure 7A:
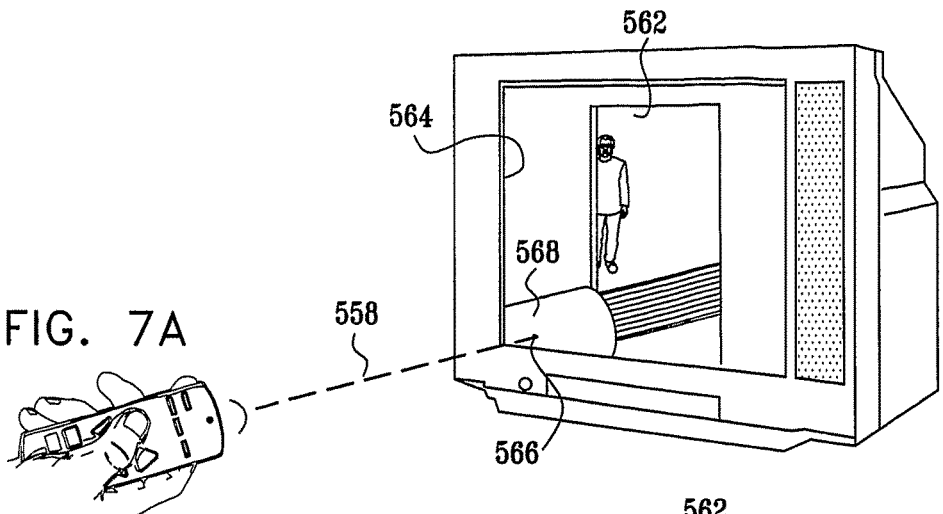
FIGS. 7A, 7B & 7C are simplified pictorial illustrations of operation of an embodiment of the present invention implemented in and in association with a television.
Figure 7B:
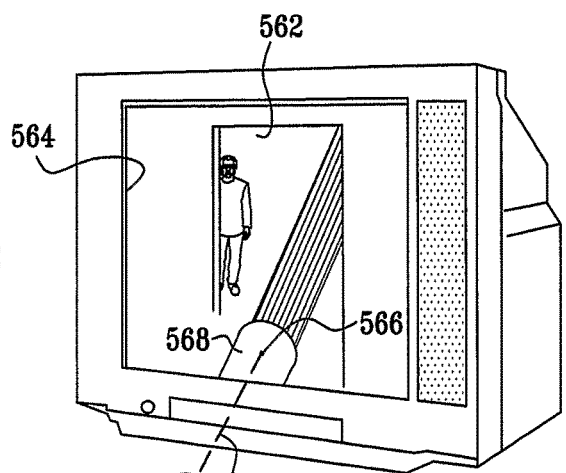
Figure 7C:
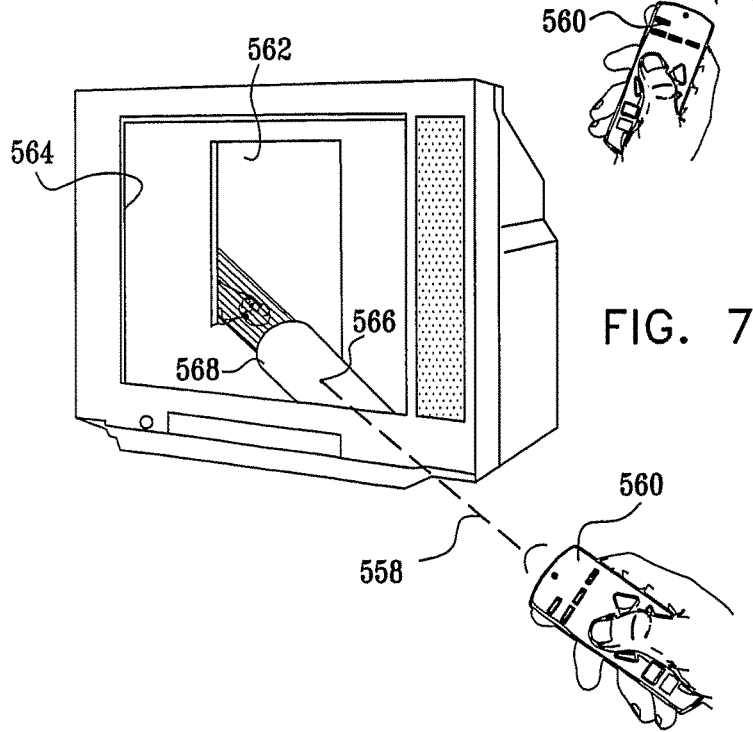

Reference is now made to 7A, 7B and 7C which illustrate operation of an embodiment of the present invention implemented in and in association with an interactive display device, such as a suitably equipped television. In the illustrated embodiment, an infra-red emitting remote control device or other suitable electromagnetic radiation beam emitter providing a generally conical beam is employed, it being appreciated that any other suitable beam configuration may be employed. FIGS. 7A-7C show that the interface of the present invention is responsive to the angular orientation an electromagnetic radiation beam 558 produced by a infra-red emitting remote control device 560 on a panel 562 defined by a television screen 564. The angular orientation is determined by sensing the eccentricity of an impingement spot 566 on the panel 562, which eccentricity is directly related to the angular orientation of the beam 558.

FIG. 7A shows the infra-red emitting remote control device 560 being held at a first three-dimensional angular orientation relative to the panel 562, preferably resulting in aiming of an object 568, such as a gun, in a first three-dimensional orientation. FIG. 7B shows the infra-red emitting remote control device 560 having been moved to a second three-dimensional angular orientation relative to panel 562, preferably resulting in aiming of the gun 568 in a second three-dimensional orientation, which is preferably rotated relative to the first three-dimensional orientation thereof by an amount identical or otherwise correlated to the angular difference between the first and second three-dimensional angular orientations of the infra-red emitting remote control device 560.

FIG. 7C shows the infra-red emitting remote control device 560 having been moved to a third three-dimensional angular orientation relative to panel 562, preferably resulting in presentation of object 568 in a third three-dimensional orientation, which is preferably rotated relative to the second three-dimensional orientation thereof by an amount identical or otherwise correlated to the angular difference between the second and third three-dimensional angular orientations of the infra-red emitting remote control device 560.

It is appreciated that the foregoing illustrated functionalities are merely examples of possible applications enabled by the present invention. These and other applications may be used singly or in any combination in any given device or methodology as appropriate.

Figure 8:
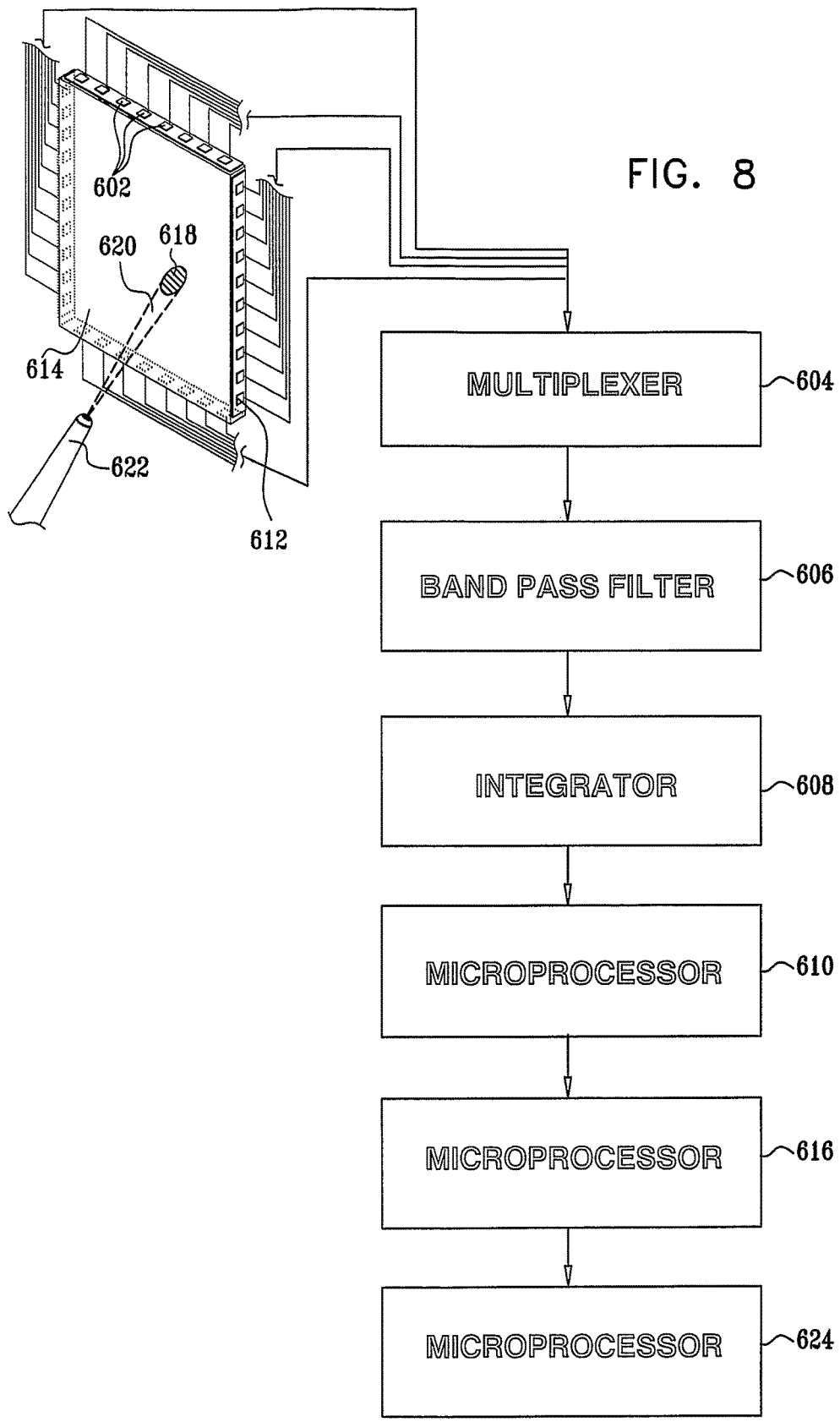
FIG. 8 is a partially block diagram, partially diagrammatic illustration of information extraction circuitry associated with the light pen and light receiving and sensing apparatus of FIGS. 1-3 in accordance with a preferred embodiment of the present invention.

Reference is now made to FIG. 8, which is a partially block diagram, partially diagrammatic illustration of information extraction circuitry associated with the electromagnetic radiation receiving and sensing apparatus of FIGS. 1-3 in accordance with a preferred embodiment of the present invention. As seen in FIG. 8, the outputs from detectors 602 are multiplexed in one or more multiplexers, here shown as multiplexer 604 which is operative to sample the outputs of the sensors at a relatively high rate, typically about 10 KHz. The output of the multiplexer 604 is preferably supplied, preferably via a band pass filter 606, to an integrator 608. The output of the integrator is supplied to a microprocessor 610 which is programmed to provide combined outputs representing the outputs of detectors along each edge 612 of panel 614.

The outputs of microprocessor 610 are preferably provided to a microprocessor 616, which provides outputs representing location, orientation, shape and size of an impingement spot 618 on panel 614 produced by impingement thereon of a beam 620 of electromagnetic radiation produced by an electromagnetic radiation emitter 622. The outputs of microprocessor 616 are preferably supplied to an additional microprocessor 624, which provides outputs representing the distance and angular orientation of the electromagnetic radiation emitter 622 in real time. Alternatively, one or more of the aforementioned microprocessor functions may be combined or split as appropriate.

It will be appreciated by persons skilled in the art that the present invention is not limited by what has been particularly shown and described hereinabove. Rather, the scope of the present invention includes both combinations and subcombinations of the various features described hereinabove, as well as modifications and variations thereof which would occur to a person of ordinary skill in the art upon reading the foregoing description and which are not in the prior art.

The invention claimed is:

1. An interface apparatus, comprising:
   a transparent panel that receives a beam of electromagnetic radiation transmitted by an emitter positioned at a variable distance from the transparent panel and at a variable angle relative to the transparent panel, the transparent panel directing electromagnetic radiation from a region of incidence toward at least one edge in a scatter pattern having an area that increases relative to a distance from the region of incidence;
   a plurality of detectors positioned along the at least one edge of the transparent panel and having a respective field of view of about 8 degrees, one or more of the plurality of detectors detecting a portion of the electromagnetic radiation from the region of incidence based on the scatter pattern and the respective field of view; and
   processing circuitry that:
   determines one or more of a first location, a first shape, or a first area corresponding to a first region of incidence;
   presents an object for display in a first orientation based on the one or more of the first location, the first shape, or the first area;
   determines one or more of a second location, a second orientation, a second shape, or a second area corresponding to a second region of incidence;
   presents the object for display in a second orientation based on one or more differences between the first region of incidence and the second region of incidence.

2. The interface apparatus according to claim 1, wherein the transparent panel is selected from a group consisting of: a display panel, a mobile telephone display panel, a handheld computing device display panel, a television panel and an input pad panel.

3. The interface apparatus according to claim 1, wherein the plurality of detectors comprises a substantially linear array of detectors.

4. The interface apparatus according to claim 1, wherein the plurality of detectors further detect the electromagnetic radiation at predetermined frequencies in at least one of visible range or a non-visible range.

5. The interface apparatus according to claim 1, wherein the transparent panel attenuates and directs electromagnetic radiation transmitted by a plurality of beams.

6. The interface apparatus according to claim 1, wherein the one or more of the plurality of detectors further detects the portion of the electromagnetic radiation transmitted from at least one of a modulated beam, a beam of visible light, or a beam of non-visible electromagnetic radiation.

7. The interface apparatus according claim 1, wherein the processing circuitry outputs an indication of the at least one of the first location, the first shape, or the first area corresponding to the first region of incidence.

8. The interface apparatus according to claim 1, wherein the processing circuitry further determines an angular orientation of the emitter based on at least one of the first location, the first shape, or the first area corresponding to the first region of incidence.

9. The interface apparatus according to claim 1, wherein the variable distance is represented by a Z-distance between the emitter and a plane defined by a surface of the transparent panel, wherein the processing circuitry further determines the Z-distance based on the portion of electromagnetic radiation detected by the one or more of the plurality of detectors.

10. The interface apparatus according to claim 1,
wherein the variable distance is represented by a Z-distance between the emitter and a plane defined by a surface of the transparent panel, and
wherein the processing circuitry further:
determines an eccentricity of the first area corresponding to the first region of incidence;
determines a center point for the first region of incidence; and
determines the variable distance between the emitter and the transparent panel based on the eccentricity and the center point.

11. The interface apparatus according to claim 1, wherein the processing circuitry further outputs an indication of a trajectory of the emitter based on the portion of electromagnetic radiation detected by the one or more of the plurality of detectors.

12. The interface apparatus according to claim 1, wherein the processing circuitry further:
determines one or more variations in intensity of the electromagnetic radiation based on the one or more differences between the first region of incidence and the second region of incidence, and
determines an angle of intersection between the electromagnetic radiation transmitted by the emitter and the transparent panel based on the one or more variations in intensity of the electromagnetic radiation.

13. A method comprising:
providing a transparent panel that scatters electromagnetic radiation from a region of incidence toward at least one edge according to a scatter pattern having an area that increases relative to a distance from the region of incidence;
positioning an array of detectors having a respective field of view of about 8 degrees along at least one edge of the transparent panel;
detecting, by one or more detectors of the array of detectors, the electromagnetic radiation from the region of incidence based on the scatter pattern and the respective field of view;
determining, by processing circuitry, a first distance and a first angle of an emitter relative to the transparent panel based on the electromagnetic radiation detected by the one or more detectors;
presenting, by processing circuitry, an object for display in a first orientation based on the first distance and the first angle of the emitter relative to the transparent panel;
determining, by processing circuitry, a second distance and a second angle of the emitter relative to the transparent panel based on a change in the electromagnetic radiation detected by the one or more detectors;
presenting, by processing circuitry, the object for display in a second orientation based on the change in the electromagnetic radiation detected by the one or more detectors.

14. The method according to claim 13, wherein the transparent panel includes at least one of a display panel, a mobile telephone display panel, a hand-held computing device display panel, a television display panel, or an input pad panel.

15. The method according to claim 13, wherein detecting the electromagnetic radiation from the region of incidence further comprises detecting one or more of a visible frequency of the electromagnetic radiation or a non-visible frequency of the electromagnetic radiation.

16. The method according to claim 13, wherein the electromagnetic radiation incident to the transparent panel is transmitted by a plurality of beams.

17. The method according to claim 13, further comprising:
providing the emitter, wherein the emitter transmits at least one of a modulated beam, a beam of visible electromagnetic radiation, or a beam of non-visible electromagnetic radiation to form the region of incidence on the transparent panel.

18. The method according to claim 13, wherein determining the first distance and the first angle further comprises determining, by the processing circuitry, at least one of a location, an orientation, a shape, or an area of the region of incidence.

19. The method according to claim 13, wherein determining the first distance and the first angle further comprises determining, by the processing circuitry, at least one of a location or an angular orientation of the emitter relative to the transparent panel.

20. The method according to claim 19, wherein the location represents a distance between a plane defined by a surface of the transparent panel and the emitter.

21. The method according to claim 13, further comprising:
determining, by the processing circuitry, an impingement area corresponding to the region of incidence;
determining, by the processing circuitry, an eccentricity for the impingement area corresponding to the region of incidence;
determining, by the processing circuitry, a center point for the impingement area; and
determining, by the processing circuitry, a distance between the emitter and the transparent panel based on the eccentricity and the center point.

22. The method according to claim 13, further comprising:
determining, by the processing circuitry, a trajectory of the emitter based on the electromagnetic radiation detected by the one or more detectors.

23. The method according to claim 13, further comprising:
determining one or more variations in intensity of the electromagnetic radiation based on the change in the electromagnetic radiation detected by the one or more detectors;
determining, by the processing circuitry, an angle of intersection between the electromagnetic radiation transmitted by the emitter and the transparent panel based on the one or more variations in intensity of the electromagnetic radiation.

24. An interface apparatus comprising:
a panel for receiving electromagnetic radiation in a region of incidence and directing the electromagnetic radiation toward at least one edge of the panel in a scatter pattern having an area that increases relative to a distance from the region of incidence, wherein an emitter transmits the electromagnetic radiation at a variable distance and a variable angle relative to the panel;
multiple detectors having a respective field of view of about 8 degrees and forming an array positioned along the at least one edge of the panel, the array detecting the electromagnetic radiation from the region of incidence based on the scatter pattern and the respective field of view; and
processing circuitry connected to the array that:

determines a first distance and a first angle of the of the emitter relative to the panel based on one or more signals provided by the array;
presents an object for display in a first orientation based on the first distance and the first angle of the emitter relative to the transparent panel;
determines a second distance and a second angle of the emitter relative to the transparent panel based on the one or more signals provided by the array;
presents the object for display in a second orientation based on a difference between the first distance and the second distance, and a difference between the first angle and the second angle.

* * * * *